US011840143B2

(12) United States Patent
Hirakuri

(10) Patent No.: US 11,840,143 B2
(45) Date of Patent: Dec. 12, 2023

(54) CRUISE CONTROL FOR CONTROLLING A STRADDLE-TYPE VEHICLE DURING CORNERING

(71) Applicant: Robert Bosch GmbH, Stuttgart (DE)

(72) Inventor: Kazuhiko Hirakuri, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 17/280,984

(22) PCT Filed: Sep. 13, 2019

(86) PCT No.: PCT/IB2019/057723
§ 371 (c)(1),
(2) Date: Mar. 29, 2021

(87) PCT Pub. No.: WO2020/065434
PCT Pub. Date: Apr. 2, 2020

(65) Prior Publication Data
US 2021/0339626 A1    Nov. 4, 2021

(30) Foreign Application Priority Data
Sep. 28, 2018   (JP) ................................ 2018-183030

(51) Int. Cl.
*B60K 31/00* (2006.01)
*B62J 45/20* (2020.01)
(Continued)

(52) U.S. Cl.
CPC ........ *B60K 31/0066* (2013.01); *B60T 8/1706* (2013.01); *B62J 45/20* (2020.02);
(Continued)

(58) Field of Classification Search
CPC ........ B60K 31/0066; B60K 2031/0091; B60T 8/1706; B60T 2201/02; B60T 2201/16;
(Continued)

(56) References Cited

U.S. PATENT DOCUMENTS 7,522,091 B2 *   4/2009   Cong ..................... G01C 21/26
                                                    342/107
9,229,453 B1 *   1/2016   Lee ........................ B60W 10/20
(Continued)

FOREIGN PATENT DOCUMENTS

EP        3048025 A1    7/2016
EP        3335955 A1    6/2018
(Continued)

OTHER PUBLICATIONS

International Search Report and Written Opinion for Application No. PCT/IB2019/057723 dated Nov. 19, 2019 (9 pages).

*Primary Examiner* — Sze-Hon Kong
(74) *Attorney, Agent, or Firm* — Michael Best & Friedrich LLP

(57) ABSTRACT

The present invention obtains a controller and a control method capable of achieving appropriate cornering during cruise control of a straddle-type vehicle.
In the controller and the control method according to the present invention, during the cruise control, in which acceleration/deceleration of the straddle-type vehicle is automatically controlled without relying on an accelerating/decelerating operation by a driver, an entry of a curved road is detected on the basis of a predicted route of the straddle-type vehicle, and the straddle-type vehicle is decelerated at a time point before the straddle-type vehicle reaches the entry.

7 Claims, 6 Drawing Sheets

(51) Int. Cl.
  *B60T 8/17*   (2006.01)
  *B62L 3/00*   (2006.01)
(52) U.S. Cl.
  CPC ........ *B62L 3/00* (2013.01); *B60K 2031/0091* (2013.01); *B60T 2201/02* (2013.01); *B60T 2201/16* (2013.01)
(58) Field of Classification Search
  CPC . B60T 8/261; B62J 45/20; B62L 3/00; B60W 30/045; B60W 2300/36; B60W 2520/10; B60W 2520/18; B60W 2552/30; B60W 2720/10; B60W 2720/106; B60W 30/162; B60W 30/18145; B60W 30/146; B60W 30/0956; B60W 2710/182; B60W 10/06; B60W 10/184; B60W 10/188; B60W 30/14; B60W 30/143; B60W 40/072; B60W 50/0097; B60W 2710/0666; B60W 2710/0677
  See application file for complete search history.

(56) References Cited

U.S. PATENT DOCUMENTS

| | | | |
|---|---|---|---|
| 9,650,043 | B2 | 5/2017 | Lee |
| 10,407,035 | B1 * | 9/2019 | Gadda ................... B60W 10/04 |
| 2005/0225477 | A1 * | 10/2005 | Cong ................. B60K 31/0083 342/72 |
| 2010/0292904 | A1 * | 11/2010 | Taguchi ............ B60W 50/0097 701/93 |
| 2012/0022739 | A1 | 1/2012 | Zeng |
| 2012/0062747 | A1 * | 3/2012 | Zeng .................... G06V 20/588 348/149 |
| 2012/0209489 | A1 | 8/2012 | Saito et al. |
| 2012/0221168 | A1 * | 8/2012 | Zeng ..................... B60W 30/12 701/1 |
| 2015/0183480 | A1 * | 7/2015 | Ono ....................... F02D 29/02 701/72 |
| 2015/0274019 | A1 * | 10/2015 | Matsuda ................ B60T 8/246 701/22 |
| 2015/0314781 | A1 | 11/2015 | Klewis et al. |
| 2016/0107682 | A1 * | 4/2016 | Tan ......................... B62D 6/00 701/41 |
| 2017/0066450 | A1 * | 3/2017 | Ko ......................... B60W 30/10 |
| 2017/0158195 | A1 * | 6/2017 | Uchida .................... G08G 1/09 |
| 2017/0270801 | A1 * | 9/2017 | Kurata ............. G08G 1/096741 |
| 2018/0181820 | A1 * | 6/2018 | Ide ...................... B60W 30/143 |
| 2018/0354523 | A1 * | 12/2018 | Kishi .................... G06V 20/588 |
| 2018/0374352 | A1 * | 12/2018 | Matsunaga ............ B60W 30/09 |
| 2019/0025063 | A1 * | 1/2019 | Eigel ................... B60W 40/072 |
| 2019/0096107 | A1 * | 3/2019 | Senno ..................... G06T 11/60 |
| 2019/0126928 | A1 * | 5/2019 | Sakaguchi ...... B60W 30/18163 |
| 2019/0217859 | A1 * | 7/2019 | Konishi ............... B60W 30/143 |
| 2019/0389461 | A1 * | 12/2019 | Ohmura .......... B60W 30/0953 |
| 2020/0189582 | A1 * | 6/2020 | Fukushige ......... G01C 21/3407 |
| 2020/0384999 | A1 * | 12/2020 | Ohmura ........... B60W 30/0956 |
| 2020/0385018 | A1 * | 12/2020 | Kameoka ........... G01C 21/3407 |
| 2021/0129838 | A1 * | 5/2021 | Hultén ................. B62D 15/025 |
| 2021/0221368 | A1 * | 7/2021 | Lavi ....................... G06V 20/56 |

FOREIGN PATENT DOCUMENTS

| | | |
|---|---|---|
| IT | TO20100454 A1 | 11/2011 |
| JP | 2009116882 A | 5/2009 |

* cited by examiner

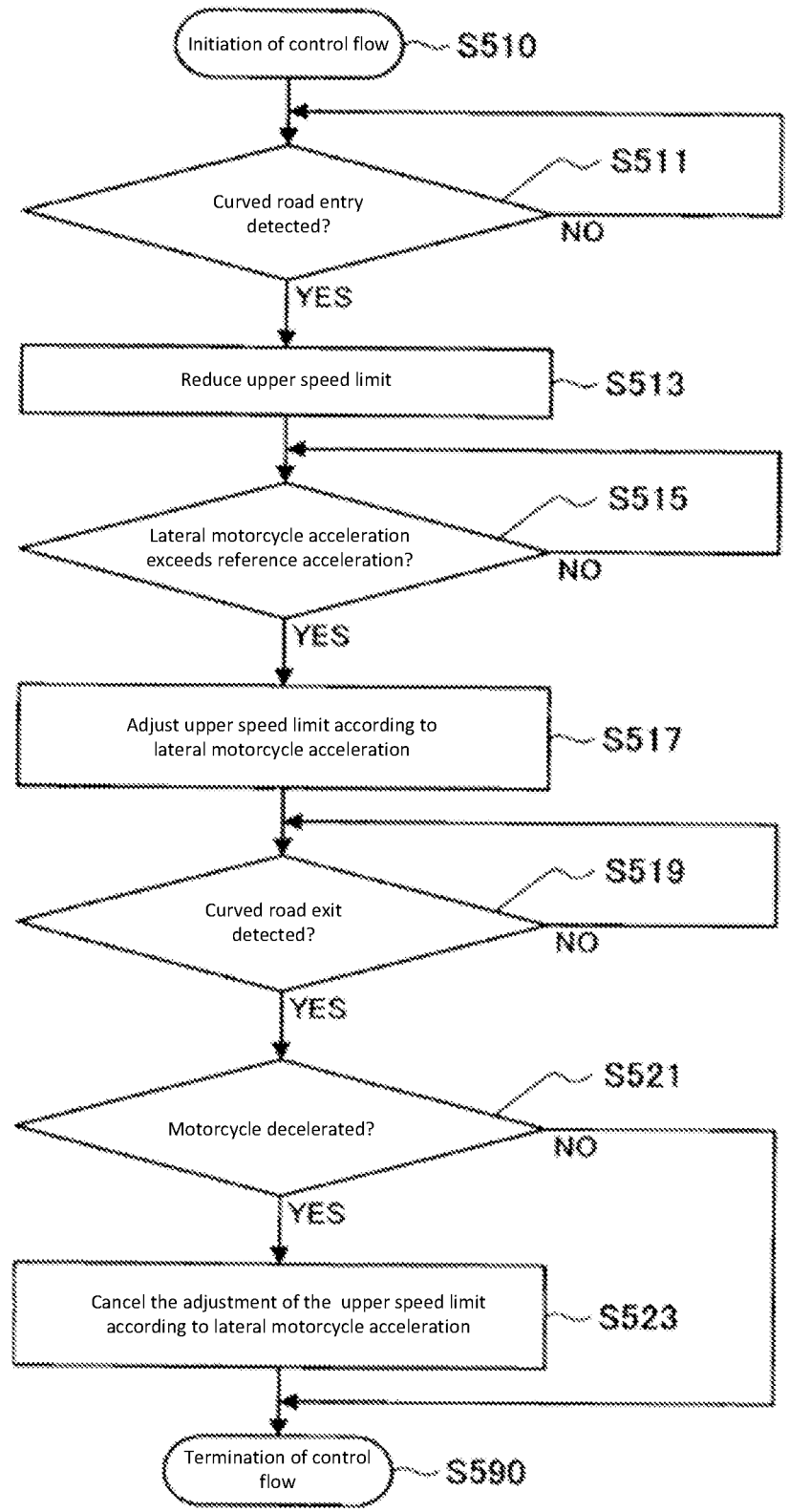

[FIG. 6]
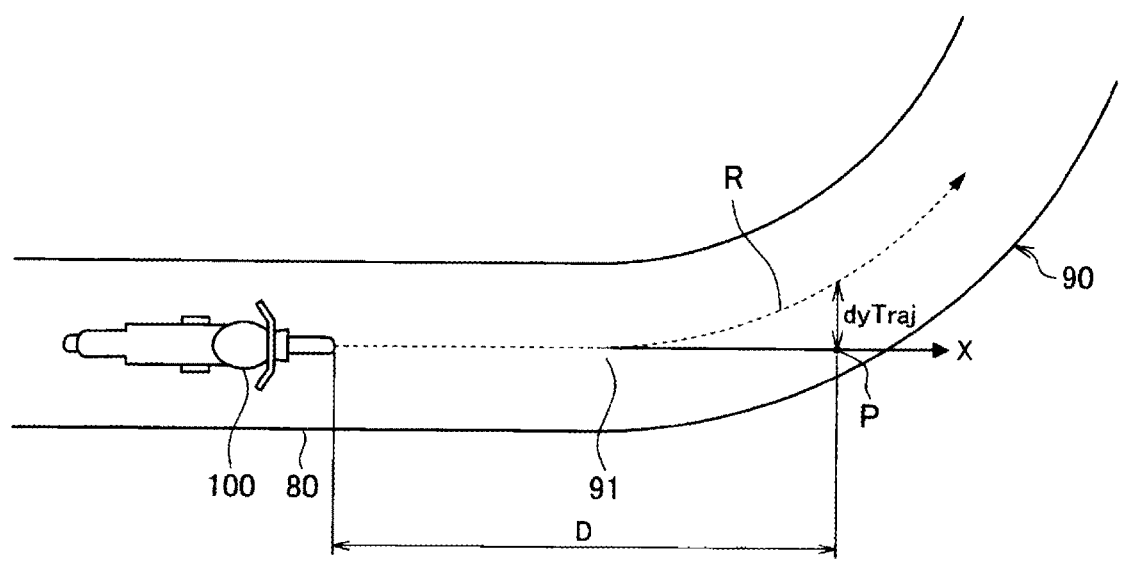

CRUISE CONTROL FOR CONTROLLING A STRADDLE-TYPE VEHICLE DURING CORNERING

BACKGROUND OF THE INVENTION

The present disclosure relates to a controller and a control method capable of achieving appropriate cornering during cruise control of a straddle-type vehicle.

As a conventional technique relating to a straddle-type vehicle, a technique of assisting with a driver's operation is available.

For example, a driver assistance system is disclosed in JP-A-2009-116882. Based on information detected by a sensor that detects an obstacle present in a travel direction or substantially in the travel direction, the driver assistance system warns a motorcycle driver that the motorcycle inappropriately approaches the obstacle.

SUMMARY OF THE INVENTION

By the way, as a technique of assisting with the driver's operation, it is considered to apply cruise control, in which acceleration/deceleration of the vehicle is automatically controlled without relying on an accelerating/decelerating operation by the driver, to the straddle-type vehicle such as a motorcycle. Here, differing from a four-wheeled vehicle, for example, the straddle-type vehicle corners when the driver leans the straddle-type vehicle in a rolling direction. Such an operation to change a posture of the straddle-type vehicle in the rolling direction is influenced by the acceleration/deceleration of the vehicle. Thus, in the case where the acceleration/deceleration of straddle-type vehicle is not appropriately controlled during the cruise control, appropriate cornering possibly becomes difficult.

The present invention has been made in view of the above-described problem, and therefore obtains a controller and a control method capable of achieving appropriate cornering during cruise control of a straddle-type vehicle.

Solution to Problem

A controller according to the present invention is a controller for controlling travel of a straddle-type vehicle, and includes a control section capable of executing cruise control in which acceleration/deceleration of the straddle-type vehicle is automatically controlled without relying on an accelerating/decelerating operation by a driver. During the cruise control, the control section detects an entry of a curved road on the basis of a predicted route of the straddle-type vehicle, and decelerates the straddle-type vehicle at a time point before the straddle-type vehicle reaches the entry.

A control method according to the present invention is a control method for controlling travel of a straddle-type vehicle, and includes: during cruise control in which acceleration/deceleration of the straddle-type vehicle is automatically controlled without relying on an accelerating/decelerating operation by a driver, detecting an entry of a curved road on the basis of a predicted route of the straddle-type vehicle; and decelerating the straddle-type vehicle by the controller at a time point before the straddle-type vehicle reaches the entry.

Advantageous Effects of Invention

In the controller and the control method according to the present invention, during the cruise control, in which the acceleration/deceleration of the straddle-type vehicle is automatically controlled without relying on the accelerating/decelerating operation by the driver, the entry of the curved road is detected on the basis of the predicted route of the straddle-type vehicle, and the straddle-type vehicle is decelerated at the time point before the straddle-type vehicle reaches the entry. As a result, when the straddle-type vehicle reaches the entry of the curved road, the driver can appropriately perform an operation to tilt the straddle-type vehicle in a rolling direction. Therefore, the straddle-type vehicle can appropriately corner during the cruise control.

BRIEF DESCRIPTION OF THE DRAWINGS

FIG. 5 is a flowchart of an exemplary processing procedure that is executed by the controller according to the embodiment of the present invention.

FIG. 6 is a view for illustrating an index value dyTraj used to detect an entry and an exit of a curved road.

DETAILED DESCRIPTION

Figure 1:
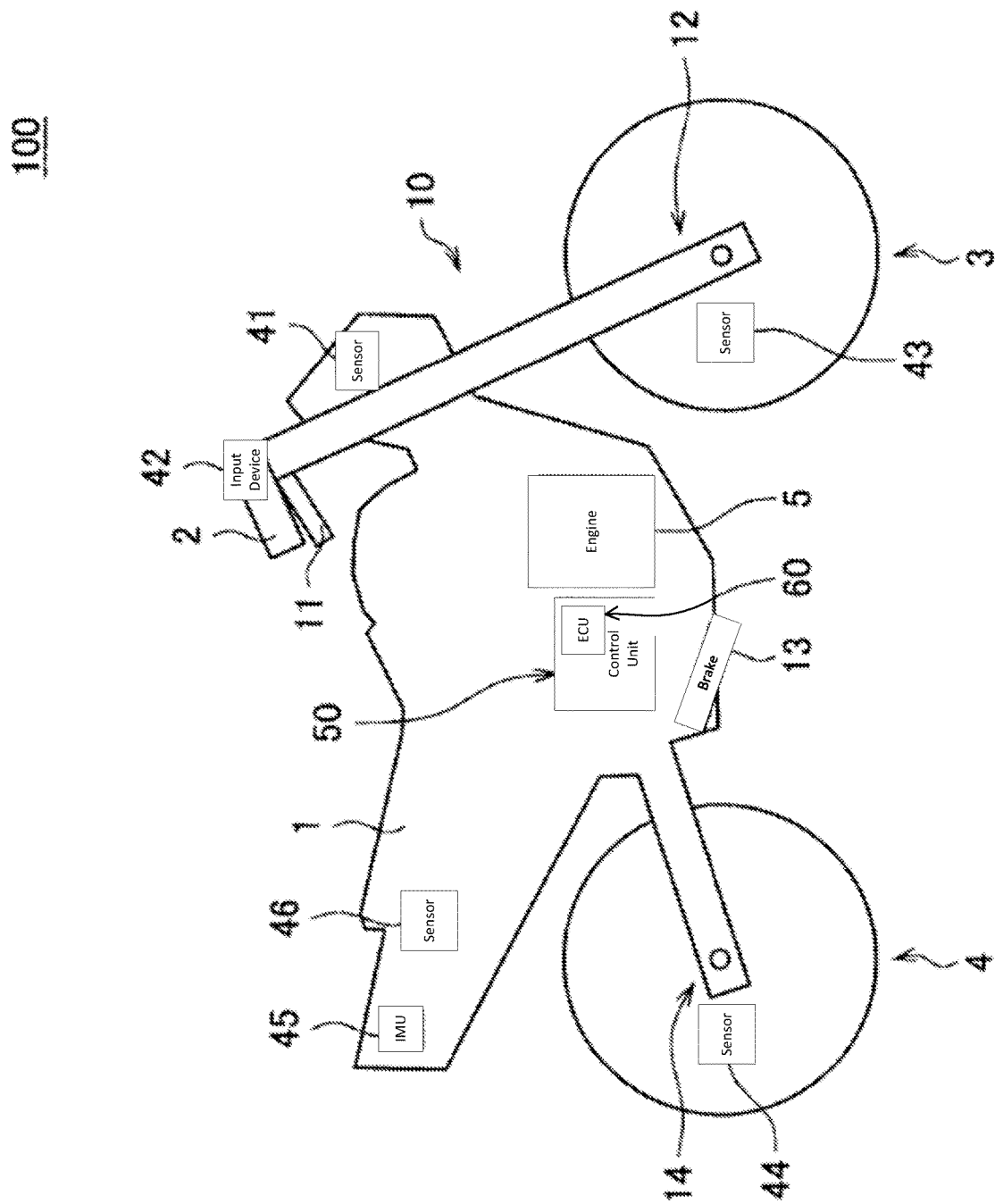
FIG. 1 is a schematic view of a configuration of a motorcycle on which a controller according to an embodiment of the present invention is mounted.

A description will hereinafter be made on a controller according to the present invention with reference to the drawings. Hereinafter, a description will be made on the controller used for a two-wheeled motorcycle. However, the controller according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a driver straddles.

In addition, a description will hereinafter be made on a case where an engine is mounted as a drive source capable of outputting drive power for driving a wheel of the motorcycle. However, as the drive source of the motorcycle, a drive source other than the engine (for example, a motor) may be mounted, or multiple drive sources may be mounted. A description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units. Alternatively, one of the front-wheel brake mechanism and the rear-wheel brake mechanism may not be provided.

A description will hereinafter be made on a case where, as cruise control, adaptive cruise control is executed by a control section 62 of the controller 60. However, the control section 62 may execute, as the cruise control, so-called auto-cruise control for controlling the motorcycle such that a speed thereof becomes a set speed, which is set in advance.

In such a case, the control section 62 executes acceleration/deceleration control of a motorcycle 100, which is executed to achieve appropriate cornering during the adaptive cruise control and will be described later, during the auto-cruise control, so as to be able to achieve the appropriate cornering.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Motorcycle>

A description will be made on a configuration of a motorcycle 100 on which the controller 60 according to the embodiment of the present invention is mounted with reference to FIG. 1 to FIG. 4.

Figure 2:
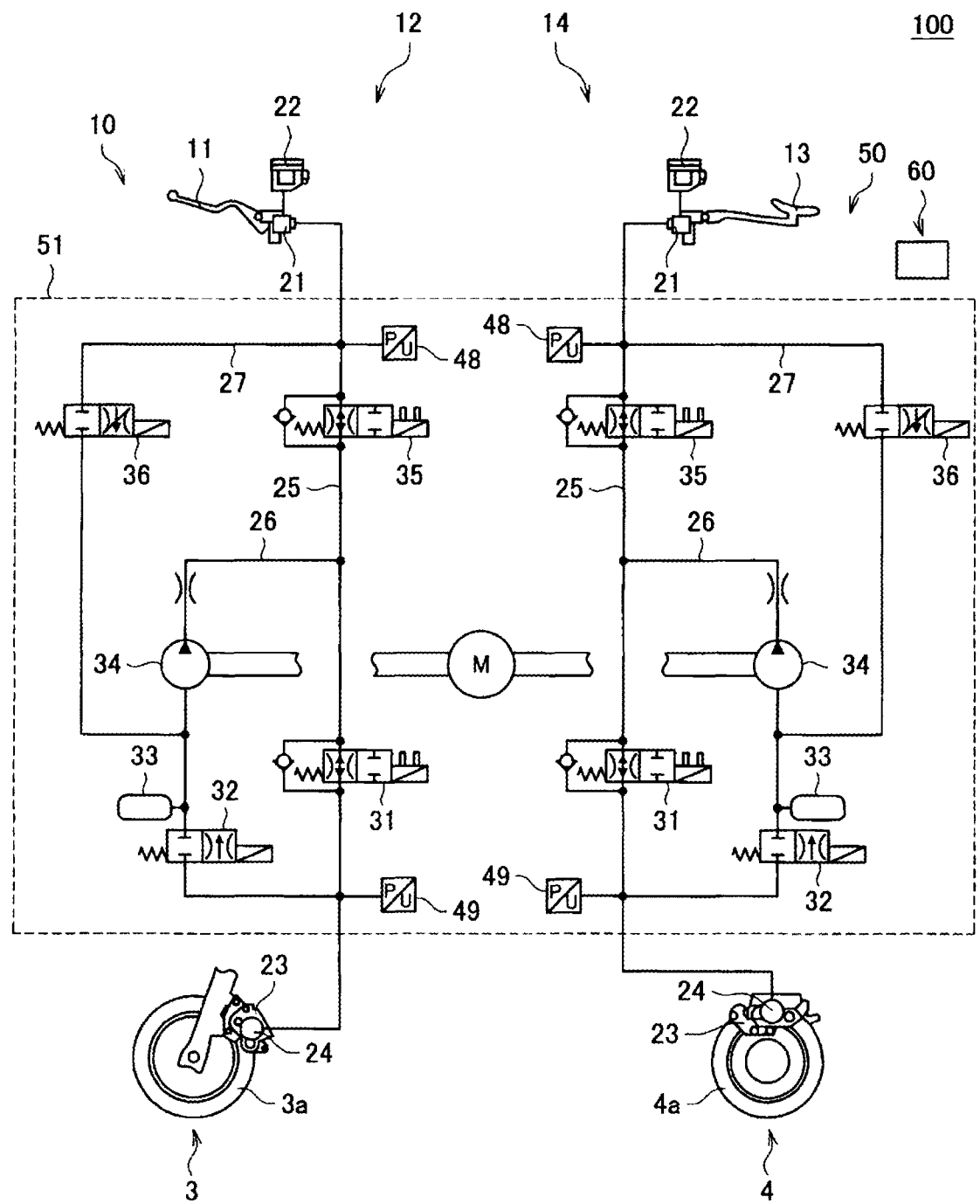
FIG. 2 is a schematic view of a configuration of a brake system according to the embodiment of the present invention.
Figure 3:
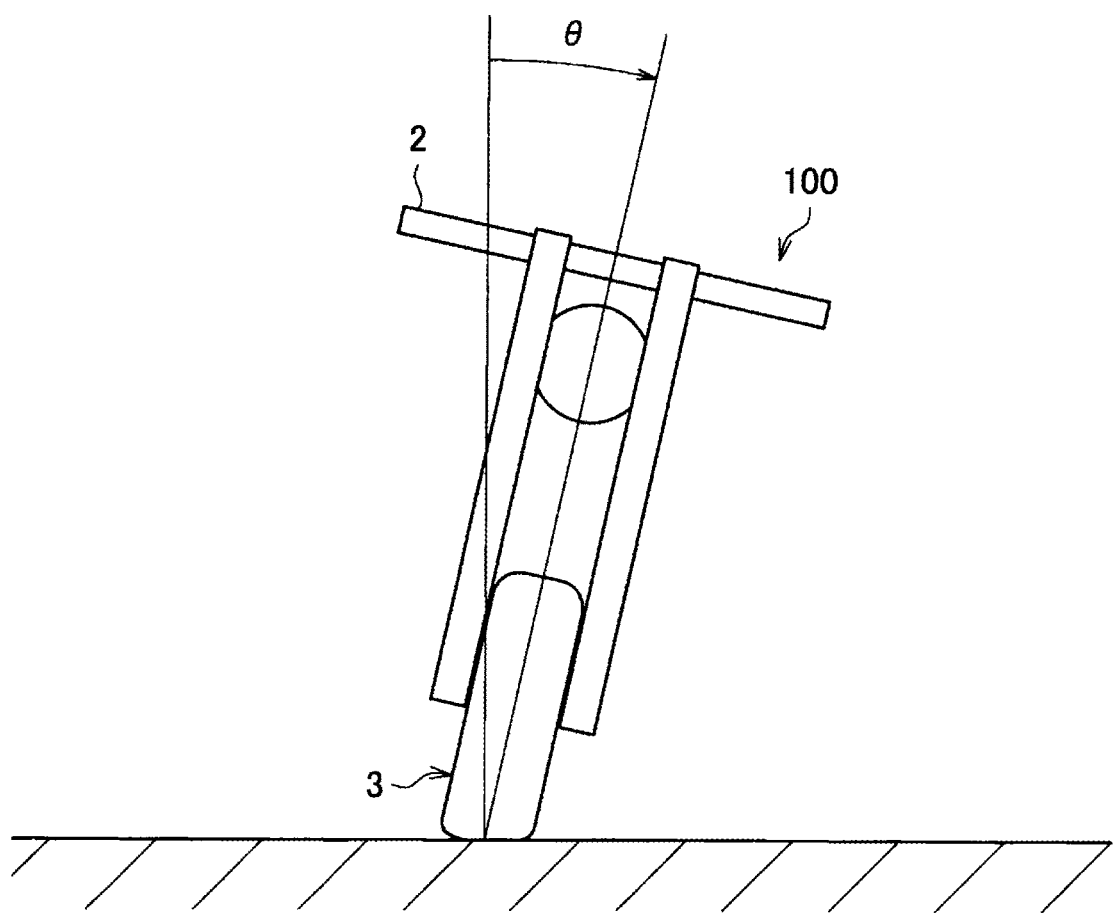
FIG. 3 is a view for illustrating a lean angle.
Figure 4:
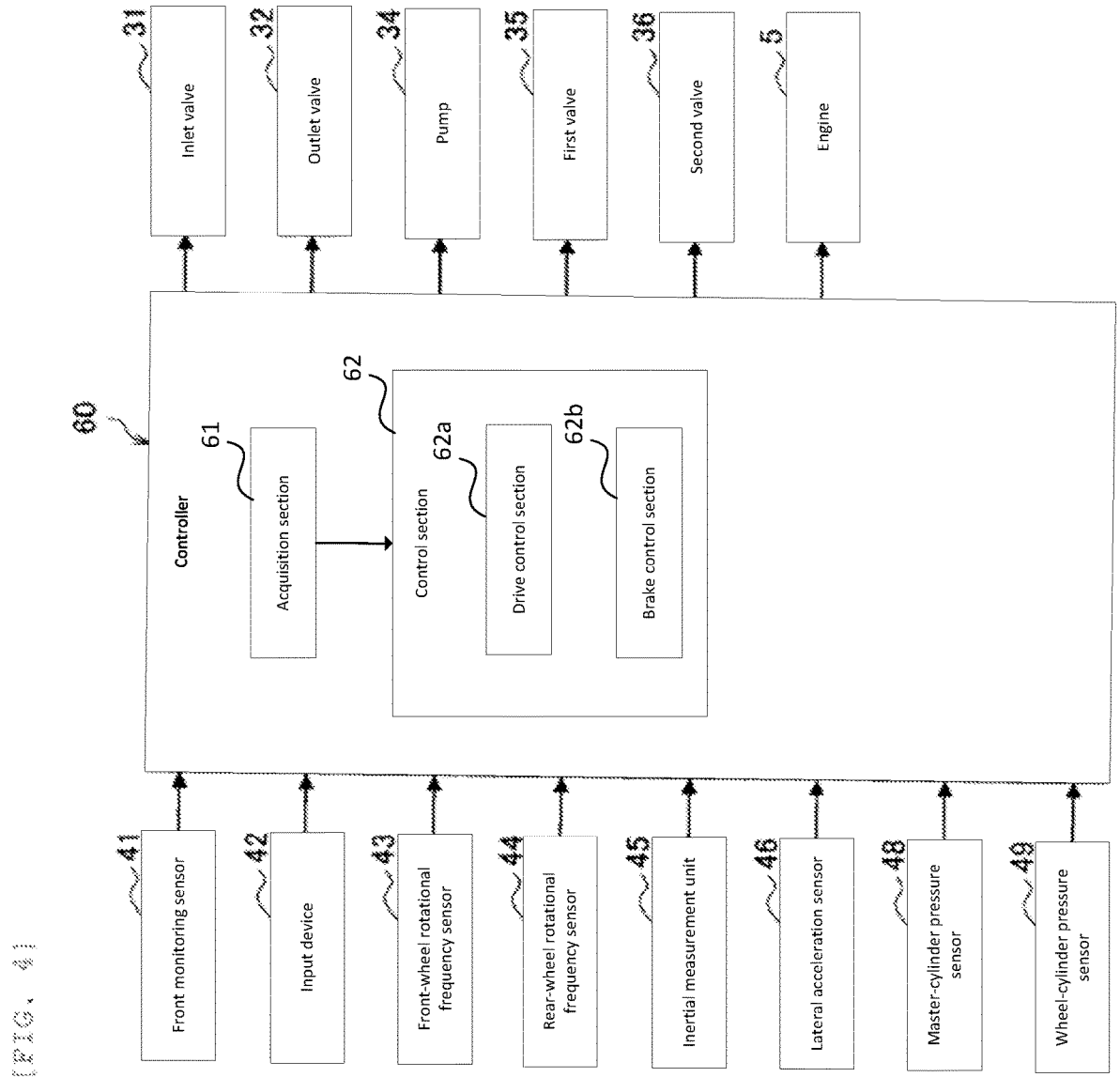
FIG. 4 is a block diagram of an exemplary functional configuration of the controller according to the embodiment of the present invention.

FIG. 1 is a schematic view of the configuration of the motorcycle 100 on which the controller 60 is mounted. FIG. 2 is a schematic diagram of a configuration of a brake system 10. FIG. 3 is a view for illustrating a lean angle. FIG. 4 is a block diagram of an exemplary functional configuration of the controller 60.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; the engine 5; and the brake system 10. In this embodiment, the controller (ECU) 60 is provided in a hydraulic pressure control unit 50 of the brake system 10, which will be described later. As illustrated in FIG. 1 and FIG. 2, the motorcycle 100 further includes: a front monitoring sensor 41, an input device 42, a front-wheel rotational frequency sensor 43, a rear-wheel rotational frequency sensor 44, an inertial measurement unit (IMU) 45, a lateral acceleration sensor 46, a master-cylinder pressure sensor 48, and a wheel-cylinder pressure sensor 49.

The engine 5 corresponds to an example of the drive source for the motorcycle 100, and can output power for driving a wheel (more specifically, the rear wheel 4). For example, the engine 5 is provided with: one or multiple cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided in an intake pipe of the engine 5, and an intake air amount for the combustion chamber varies according to a throttle opening amount as an opening degree of the throttle valve.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and a part of the front-wheel brake mechanism 12 and a part of the rear-wheel brake mechanism 14 are included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided on the handlebar 2 and is operated by the driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which the piston (not illustrated) is installed; a reservoir 22 that is attached to the master cylinder 21; a brake caliper 23 that is held by the trunk 1 and has a brake pad (not illustrated); a wheel cylinder 24 that is provided in the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion of the primary channel 25 to which a downstream end of the secondary channel 26 is connected, a first valve (USV) 35 is provided. The supply channel 27 communicates between the master cylinder 21 and a portion of the secondary channel 26 on a suction side of the pump 34. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 in which those components are provided and channels constituting the primary channels 25, the secondary channels 26, and the supply channels 27 are formed; and the controller 60.

The base body 51 may be formed of one member or may be formed of multiple members. In the case where the base body 51 is formed of the multiple members, the components may separately be provided in the different members.

The controller 60 controls operation of each of the components in the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

For example, in a normal time (that is, when none of the adaptive cruise control and anti-lock brake control, which will be described later, is executed), the controller 60 opens the inlet valves 31, closes the outlet valves 32, opens the first valves 35, and closes the second valves 36. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The front monitoring sensor 41 monitors an area in front of the motorcycle 100 and detects various information on the area in front of the motorcycle 100. More specifically, the front monitoring sensor 41 detects a predicted route that is a route predicted as a route the motorcycle 100 will travel through in the future. The front monitoring sensor 41 may detect another physical quantity that can substantially be converted to the predicted route of the motorcycle 100. The front monitoring sensor 41 also detects a distance from the motorcycle 100 to a preceding vehicle. The front monitoring sensor 41 may detect another physical quantity that can substantially be converted to the distance from the motorcycle 100 to the preceding vehicle.

Here, the preceding vehicle means a vehicle ahead of the motorcycle 100 and may include, in addition to the nearest vehicle from the motorcycle 100 on the same lane as a travel lane of the motorcycle 100, a vehicle ahead of several vehicles in front of the motorcycle 100, a vehicle traveling on an adjacent lane to the travel lane of the motorcycle 100, and the like. For example, in the case where the multiple vehicles exist ahead of the motorcycle 100, based on the predicted route of the motorcycle 100 and behavior of each of the multiple vehicles, the front monitoring sensor 41 selects the preceding vehicle as a detection target of the distance from the motorcycle 100. In this case, the adaptive cruise control, which will be described later, is executed by using a detection result of the distance from the motorcycle 100 to the thus-selected preceding vehicle.

As the front monitoring sensor 41, for example, a camera that captures an image in front of the motorcycle 100 and a radar that can detect a distance from the motorcycle 100 to a target in front are used. In such a case, for example, white lines, guardrails, and the like are recognized by using the image captured by the camera. Then, by using the recognition result of these and a detection result by the radar, the predicted route of the motorcycle 100 can be detected. In addition, for example, the preceding vehicle is recognized by using the image captured by the camera. Then, by using the recognition result of the preceding vehicle and the detection result by the radar, the distance from the motorcycle 100 to the preceding vehicle can be detected. The front monitoring sensor 41 is provided in a front portion of the trunk 1, for example.

Note that the configuration of the front monitoring sensor 41 is not limited to that in the above example. For example, the function of detecting the predicted route of the motorcycle 100 and the function of detecting the distance from the motorcycle 100 to the preceding vehicle by the front monitoring sensor 41 may be realized by a stereo camera. Alternatively, the function of detecting the predicted route of the motorcycle 100 by the front monitoring sensor 41 may be realized by using a signal received from the Global Positioning System (GPS) satellite, for example.

The input device 42 accepts a travel mode selection operation by the driver, and outputs information on the travel mode selected by the driver. As will be described later, in the motorcycle 100, the controller 60 can execute the adaptive cruise control. The adaptive cruise control corresponds to an example of the cruise control in which the acceleration/deceleration of the motorcycle 100 is automatically controlled without relying on an accelerating/decelerating operation by the driver, and is control that makes the motorcycle 100 travel according to the distance from the motorcycle 100 to the preceding vehicle, motion of the motorcycle 100, and the driver's instruction. By using the input device 42, the driver can select, as one of the travel modes, a travel mode in which the adaptive cruise control is executed. For example, as the input device 42, a lever, a button, a touch screen, or the like is used. The input device 42 is provided on the handlebar 2, for example.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The front-wheel rotational frequency sensor 43 is provided on the front wheel 3.

The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The rear-wheel rotational frequency sensor 44 is provided on the rear wheel 4.

The inertial measurement unit 45 includes a three-axis gyroscope sensor and a three-directional acceleration sensor, and detects a posture of the motorcycle 100. For example, the inertial measurement unit 45 detects the lean angle of the motorcycle 100, and outputs a detection result. The inertial measurement unit 45 may detect another physical quantity that can substantially be converted to the lean angle of the motorcycle 100. For example, the lean angle corresponds to a tilt angle θ of the motorcycle 100 in a rolling direction with respect to an upper vertical direction illustrated in FIG. 3. The inertial measurement unit 45 is provided in the trunk 1, for example. In the motorcycle 100, instead of the inertial measurement unit 45, a sensor that only has a function of detecting the lean angle may be used.

The lateral acceleration sensor 46 detects lateral acceleration of the motorcycle 100, and outputs a detection result. The lateral acceleration sensor 46 may detect another physical quantity that can substantially be converted to the lateral acceleration of the motorcycle 100. The lateral acceleration is a component of the acceleration, which is generated on the motorcycle 100, in a lateral direction (that is, a vehicle width direction) of the motorcycle 100. The lateral acceleration sensor 46 is provided in the trunk 1, for example.

The master-cylinder pressure sensor 48 detects the hydraulic pressure of the brake fluid in the master cylinder 21, and outputs a detection result. The master-cylinder pressure sensor 48 may detect another physical quantity that can substantially be converted to the hydraulic pressure of the brake fluid in the master cylinder 21. The master-cylinder pressure sensor 48 is provided in each of the front-wheel brake mechanism 12 and the rear-wheel brake mechanism 14.

The wheel-cylinder pressure sensor 49 detects the hydraulic pressure of the brake fluid in the wheel cylinder 24, and outputs a detection result. The wheel-cylinder pressure sensor 49 may detect another physical quantity that can substantially be converted to the hydraulic pressure of the brake fluid in the wheel cylinder 24. The wheel-cylinder pressure sensor 49 is provided in each of the front-wheel brake mechanism 12 and the rear-wheel brake mechanism 14.

The controller 60 controls the travel of the motorcycle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

As illustrated in FIG. 4, the controller 60 includes an acquisition section 61 and the control section 62, for example.

The acquisition section 61 acquires information that is output from each of the devices mounted on the motorcycle 100, and outputs the acquired information to the control section 62. For example, the acquisition section 61 acquires the information output from the front monitoring sensor 41, the input device 42, the front-wheel rotational frequency sensor 43, the rear-wheel rotational frequency sensor 44, the inertial measurement unit 45, the lateral acceleration sensor 46, the master-cylinder pressure sensor 48, and the wheel-cylinder pressure sensor 49.

The control section 62 controls operation of each of the devices mounted on the motorcycle 100, so as to control the drive power and the braking force exerted on the motorcycle 100. In this way, the control section 62 can control the acceleration/deceleration of the motorcycle 100.

Here, by controlling the operation of each of the devices mounted on the motorcycle 100, the control section 62 can execute, as the cruise control, the adaptive cruise control in which the motorcycle 100 is made to travel according to the distance from the motorcycle 100 to the preceding vehicle, the motion of the motorcycle 100, and the driver's instruction. More specifically, in the case where the driver selects the travel mode in which the adaptive cruise control is executed, the control section 62 executes the adaptive cruise control. Note that, in the case where the driver performs the accelerating/decelerating operation (that is, an accelerator operation or a brake operation) during the adaptive cruise control, the control section 62 cancels the adaptive cruise control.

In the adaptive cruise control, the acceleration/deceleration of the motorcycle 100 is basically controlled such that the distance from the motorcycle 100 to the preceding vehicle approximates a target distance. As the distance from the motorcycle 100 to the preceding vehicle, the target distance is set to a value with which the driver's safety can be secured. In the case where no preceding vehicle is recognized, similar to the auto-cruise control, the acceleration/deceleration of the motorcycle 100 is controlled such that a speed of the motorcycle 100 becomes a set speed, which is set in advance. In addition, in the adaptive cruise control, the acceleration/deceleration of the motorcycle 100 is restricted to be equal to or lower than an upper limit value of such extent that does not worsen the driver's comfort.

More specifically, during the adaptive cruise control, the control section 62 calculates target acceleration/deceleration, with which the distance from the motorcycle 100 to the preceding vehicle approximates the target distance, on the basis of a comparison result between the distance from the motorcycle 100 to the preceding vehicle and the target distance and on the basis of a relative speed between the motorcycle 100 and the preceding vehicle. Then, the control section 62 controls the acceleration/deceleration of the motorcycle 100 to the target acceleration/deceleration.

For example, in the case where the distance from the motorcycle 100 to the preceding vehicle is longer than the target distance, the control section 62 calculates, as the target acceleration/deceleration, the acceleration that corresponds to a difference between the distance from the motorcycle 100 to the preceding vehicle and the target distance. On the other hand, in the case where the distance from the motorcycle 100 to the preceding vehicle is shorter than the target distance, the control section 62 calculates, as the target acceleration/deceleration, the deceleration that corresponds to the difference between the distance from the motorcycle 100 to the preceding vehicle and the target distance.

Note that, even in the case where the preceding vehicle is recognized and where the target acceleration/deceleration based on the set speed is lower than the target acceleration/deceleration based on the target distance, the control section 62 may control the acceleration/deceleration of the motorcycle 100 to the target acceleration/deceleration based on the set speed.

Here, during the adaptive cruise control, the control section 62 controls the speed of the motorcycle 100 to be equal to or lower than an upper limit speed.

More specifically, during the travel on a straight road, the control section 62 restricts the speed of the motorcycle 100 to be equal to or lower than the upper limit speed of such extent that does not worsen the driver's comfort.

In addition, in order to make the motorcycle 100 appropriately turn so as not to go off a curved road, during turning, the control section 62 adjusts the upper limit speed according to an inertia force index that is correlated with an inertia force generated on the motorcycle 100 by turning. In detail, the control section 62 adjusts the upper limit speed such that the upper limit speed is reduced as the inertia force index is increased. For example, the control section 62 uses the lateral acceleration of the motorcycle 100 as the inertia force index. Here, the information other than the lateral acceleration of the motorcycle 100 may be used as the inertia force index. For example, the control section 62 may use a yaw rate of the motorcycle 100 as the inertia force index.

Note that, as the lateral acceleration of the motorcycle 100, the control section 62 may use, in addition to the detection result of the lateral acceleration sensor 46, a value that is calculated by using another type of the information acquired by the controller 60. For example, the control section 62 may calculate the vehicle speed on the basis of the front-wheel rotational frequency sensor 43 and the rear-wheel rotational frequency sensor 44, and then may calculate the lateral acceleration on the basis of the vehicle speed and a turning radius. For example, the turning radius can be acquired by using the signal received from the GPS satellite.

The control section 62 includes a drive control section 62a and a brake control section 62b, for example.

The drive control section 62a controls the drive power that is transmitted to the wheel during the adaptive cruise control. More specifically, during the adaptive cruise control, the drive control section 62a outputs a command to an engine control unit (not illustrated), which outputs a signal to control operation of each of the components of the engine 5 (the throttle valve, the fuel injector, the ignition plug, and the like). In this way, the drive control section 62a controls operation of the engine 5. Consequently, during the adaptive cruise control, the drive power, which is transmitted to the wheel, is controlled.

In the normal time, the operation of the engine 5 is controlled by the engine control unit such that the drive power is transmitted to the wheel in response to the driver's accelerator operation.

Meanwhile, during the adaptive cruise control, the drive control section 62a controls the operation of the engine 5 such that the drive power is transmitted to the wheel without relying on the driver's accelerator operation. More specifically, during the adaptive cruise control, the drive control section 62a controls the operation of the engine 5 when accelerating the motorcycle 100. In this way, the drive power is transmitted to the wheel such that the acceleration/deceleration of the motorcycle 100 becomes the target acceleration/deceleration.

The brake control section 62b controls the operation of each of the components of the hydraulic pressure control unit 50 in the brake system 10, so as to control the braking force generated on each of the wheels of the motorcycle 100.

In the normal time, as described above, the brake control section 62b controls the operation of each of the components of the hydraulic pressure control unit 50 such that the braking force is generated on each of the wheels in response to the driver's brake operation.

Meanwhile, during the adaptive cruise control, the brake control section 62b controls the operation of each of the components such that the braking force is generated on each of the wheels without relying on the driver's brake operation. More specifically, during the adaptive cruise control, the brake control section 62b controls the operation of each of the components of the hydraulic pressure control unit 50 when decelerating the motorcycle 100. In this way, the braking force is generated on each of the wheels such that the acceleration/deceleration of the motorcycle 100 becomes the target acceleration/deceleration.

For example, during the adaptive cruise control, the brake control section 62b brings the motorcycle 100 into a state where the inlet valves 31 are opened, the outlet valves 32 are closed, the first valves 35 are closed, and the second valves 36 are opened, and drives the pumps 34 in such a state, so as to increase the hydraulic pressure of the brake fluid in each of the wheel cylinders 24 and generate the braking force on each of the wheels. In addition, the brake control section 62b adjusts the hydraulic pressure of the brake fluid in each of the wheel cylinders 24 by controlling an opening amount of the first valve 35, for example. In this way, the brake control section 62b can control the braking force generated on each of the wheels.

Note that, in the case where at least one of the wheels is locked or possibly locked, the brake control section 62b may execute the anti-lock brake control. The anti-lock brake control is control for adjusting the braking force of the wheel, which is locked or possibly locked, to such a magnitude that locking of the wheel can be avoided.

For example, during the anti-lock brake control, the brake control section 62b brings the motorcycle 100 into a state where the inlet valves 31 are closed, the outlet valves 32 are opened, the first valves 35 are opened, and the second valves 36 are closed, and drives the pumps 34 in such a state, so as to reduce the hydraulic pressure of the brake fluid in each of the wheel cylinders 24 and reduce the braking force generated on each of the wheels. In addition, the brake control section 62b closes both of the inlet valves 31 and the outlet valves 32 from the above state, for example. In this way, the brake control section 62b can keep the hydraulic pressure of the brake fluid in each of the wheel cylinders 24 and thus can keep the braking force generated on the each of wheels. Furthermore, the brake control section 62b opens the inlet valves 31 and closes the outlet valves 32 from the above state, for example. In this way, the brake control section 62b can increase the hydraulic pressure of the brake fluid in each of the wheel cylinders 24 and thus can increase the braking force generated on each of the wheels.

As described above, in the controller 60, the control section 62 can execute the adaptive cruise control. Here, during the adaptive cruise control, the control section 62 detects an entry of the curved road on the basis of the predicted route of the motorcycle 100, and decelerates the motorcycle 100 at a time point before the motorcycle 100 reaches the entry. As a result, the motorcycle 100 can appropriately corner during the adaptive cruise control of the motorcycle 100. Processing relating to the above control, which is executed by the controller 60 to achieve the appropriate cornering, will be described later in detail.

The description has been made above on the example in which the drive control section 62a controls the operation of the engine 5 via the engine control unit. However, the drive control section 62a may output a signal for controlling the operation of each of the components of the engine 5, so as to directly control the operation of each of the components of the engine 5. In such a case, the drive control section 62a controls the operation of the engine 5 in the normal time in a similar manner to the operation of the engine 5 during the adaptive cruise control.

<Operation of Controller>

A description will be made on operation of the controller 60 according to the embodiment of the present invention with reference to FIG. 5 and FIG. 6.

FIG. 5 is a flowchart of an exemplary processing procedure that is executed by the controller 60. More specifically, a control flow illustrated in FIG. 5 corresponds to the processing relating to the acceleration/deceleration control of the motorcycle 100, which is executed to achieve the appropriate cornering, of the processing executed by the controller 60, and is repeatedly executed during the adaptive cruise control. The control flow illustrated in FIG. 5 is initiated at the time of traveling on the straight road. In addition, step S510 and step S590 in FIG. 5 respectively corresponds to initiation and termination of the control flow illustrated in FIG. 5. FIG. 6 is a view for illustrating an index value dyTraj used to detect the entry and an exit of the curved road.

A description will be made on an example in which the lateral acceleration is used as the inertia force index, which has the correlation with the inertia force generated on the motorcycle 100 by turning, in steps S515, S517, S523. However, as described above, the yaw rate may be used as the inertia force index.

When the control flow illustrated in FIG. 5 is initiated, in step S511, the control section 62 determines whether the entry of the curved road is detected ahead of the motorcycle 100. If the control section 62 determines that the entry of the curved road is detected ahead of the motorcycle 100 (step S511/YES), the processing proceeds to step S513. On the other hand, if the control section 62 determines that the entry of the curved road is not detected ahead of the motorcycle 100 (step S511/NO), the determination processing in step S511 is repeated.

As described above, during the adaptive cruise control, the control section 62 detects the entry of the curved road on the basis of the predicted route of the motorcycle 100. The entry of the curved road means a connected portion between the curved road and a straight road that is located behind the curved road and is connected thereto. Various methods are available as a method for detecting the entry of the curved road. As one of the examples, the following description will be made on an example in which the entry of the curved road is detected by using the index value dyTraj, which will be described with reference to FIG. 6. As will be described later, the index value dyTraj is an index value that is also used to detect the exit of the curved road.

FIG. 6 is the view for illustrating the index value dyTraj. FIG. 6 illustrates a situation where a curved road 90 is located ahead of a straight road 80, on which the motorcycle 100 is traveling, and is connected thereto. As illustrated in FIG. 6, the index value dyTraj corresponds to a distance between a point P, which is away from the motorcycle 100 in an advancing direction X by a reference distance D, and a predicted trajectory R in a direction orthogonal to the advancing direction X. For example, the reference distance D is a distance for which the motorcycle 100 travels in a specified time (for example, approximately one to two seconds), and has a value that varies by the vehicle speed. In FIG. 6, the predicted trajectory R detected by the front monitoring sensor 41 is indicated by a broken arrow.

In the case where the motorcycle 100 travels behind the position illustrated in FIG. 6 and thus a distance between the motorcycle 100 and an entry 91 of the curved road 90 is longer than the reference distance D, the index value dyTraj becomes substantially 0. Thereafter, the index value dyTraj is increased from a time point at which the distance between the motorcycle 100 and the entry 91 of the curved road 90 falls below the reference distance D.

For example, in the case where the index value dyTraj exceeds a reference value, the control section 62 determines that the entry 91 of the curved road 90 is detected ahead of the motorcycle 100. The reference value is set to a value with which it is possible to appropriately determine that the index value dyTraj is increased due to the approach of the motorcycle 100 to the entry 91 of the curved road 90.

If it is determined YES in step S511, in step S513, the control section 62 reduces the upper limit speed. In this way, it is possible to decelerate the motorcycle 100 at the time point before the motorcycle 100 reaches the entry of the curved road.

When the motorcycle 100 reaches the entry of the curved road from the straight road, the driver performs an operation to tilt the motorcycle 100 in the rolling direction. In this way, the motorcycle 100 can turn. Here, when the operation to tilt the motorcycle 100 in the rolling direction is performed, the motorcycle 100 has to be decelerated. This is because, in a state where the motorcycle 100 is not decelerated, it is difficult to tilt the motorcycle 100 in the rolling direction due to a difficulty in moving the center of gravity of the motorcycle 100 to the front wheel 3 side.

As described above, in the controller 60, the control section 62 decelerates the motorcycle 100 at the time point before the motorcycle 100 reaches the entry of the curved road. As a result, the motorcycle 100 can be brought into the decelerated state when the motorcycle 100 reaches the entry of the curved road. Thus, the driver can appropriately perform the operation to tilt the motorcycle 100 in the rolling direction.

In the case where the vehicle speed of the motorcycle 100 before reducing the upper limit speed is lower than the upper limit speed after being reduced, the motorcycle 100 is not decelerated by the reduction in the upper limit speed. Meanwhile, the upper limit speed after being reduced is set to bring a situation where the motorcycle 100 can easily be tilted in the rolling direction without decelerating the motorcycle 100 in such a case.

Here, when the motorcycle 100 reaches the entry of the curved road, the motorcycle 100 has to be tilted in the rolling direction such that, as a curvature of the curved road is increased (that is, as a turning radius is reduced), a change amount of the posture of the motorcycle 100 in the rolling direction (that is, a change amount of the lean angle) is increased. Thus, from a perspective of making the driver appropriately perform the operation to tilt the motorcycle 100 in the rolling direction, the control section 62 preferably decelerates the motorcycle 100 on the basis of a curvature index correlated with the curvature of the curved road at the time point before the motorcycle 100 reaches the entry of the curved road.

More specifically, the control section 62 decelerates the motorcycle 100 such that the motorcycle 100 can easily be tilted in the rolling direction as the curvature of the curved road is increased. For example, the control section 62 reduces the upper limit speed such that the upper limit speed after being reduced has a lower value as the curvature index is increased.

The control section 62 generates information that directly indicates the curvature of the curved road on the basis of the predicted route of the motorcycle 100, for example, and uses such information as the curvature index. Note that, as the curvature index, information other than the information that directly indicates the curvature of the curved road may be used. For example, the control section 62 may use the above-described index value dyTraj as the curvature index. The index value dyTraj is increased as the motorcycle 100 approaches the entry of the curved road, and then acquires a larger value as the curvature of the curved road is increased. Thus, the index value dyTraj can be used as the curvature index.

Next, in step S515, the control section 62 determines whether the lateral acceleration of the motorcycle 100 exceeds reference acceleration. If the control section 62 determines that the lateral acceleration of the motorcycle 100 exceeds the reference acceleration (step S515/YES), the processing proceeds to step S517. On the other hand, if the control section 62 determines that the lateral acceleration of the motorcycle 100 does not exceed the reference acceleration (step S515/NO), the processing in step S515 is repeated.

The reference acceleration is set to a value with which it is possible to appropriately determine that the lateral acceleration starts generating on the motorcycle 100 due to a fact that the motorcycle 100 passes the entry of the curved road and starts turning along the curved road.

If it is determined YES in step S515, in step S517, the control section 62 permits the adjustment of the upper limit speed according to the lateral acceleration of the motorcycle 100. In this way, the motorcycle 100 can appropriately turn without going off the curved road. In detail, as a result of the adjustment of the upper limit speed according to the lateral acceleration during turning, the motorcycle 100 can travel along the curved road in a state of maintaining the lean angle of the motorcycle 100.

Note that the control section 62 preferably changes the upper limit speed in a manner to suppress a rapid change in the upper limit speed at the time when the adjustment of the upper limit speed according to the lateral acceleration is permitted and started.

Next, in step S519, the control section 62 determines whether the exit of the curved road is detected ahead of the motorcycle 100. If the control section 62 determines that the exit of the curved road is detected ahead of the motorcycle 100 (step S519/YES), the processing proceeds to step S521. On the other hand, if the control section 62 determines that the exit of the curved road is not detected ahead of the motorcycle 100 (step S519/NO), the processing in step S519 is repeated.

Here, during the adaptive cruise control, the control section 62 detects the exit of the curved road on the basis of the predicted route of the motorcycle 100. The exit of the curved road means a connected portion between the curved road and a straight road that is located ahead of the curved road and is connected thereto. Various methods are available as a method for detecting the exit of the curved road. As one of the examples, the following description will be made on an example in which the exit of the curved road is detected by using the index value dyTraj, which has been described with reference to FIG. 6.

As described above with reference to FIG. 6, the index value dyTraj corresponds to the distance between the point P, which is away from the motorcycle 100 in the advancing direction X by the reference distance D, and the predicted trajectory R in the direction orthogonal to the advancing direction X. Thus, after the motorcycle 100 passes the entry 91 of the curved road 90, the index value dyTraj becomes substantially constant during the travel on the curved road 90. Thereafter, the index value dyTraj starts being reduced from a time point at which a distance between the motorcycle 100 and the exit (not illustrated) of the curved road 90 falls below the reference distance D.

For example, in the case where the index value dyTraj falls below a reference value, the control section 62 determines that the exit of the curved road 90 is detected ahead of the motorcycle 100. The reference value is set to a value with which it is possible to appropriately determine that the index value dyTraj is reduced due to the approach of the motorcycle 100 to the exit of the curved road 90.

Next, in step S521, the control section 62 determines whether the motorcycle 100 is decelerated. If the control section determines whether the motorcycle 100 is decelerated (step S521/YES), the processing proceeds to step S523. On the other hand, if the control section 62 determines whether the motorcycle 100 is not decelerated (step S521/NO), the processing proceeds to step S590, and the control flow illustrated in FIG. 5 is terminated.

As described above, during the adaptive cruise control, the speed of the motorcycle 100 is controlled to be equal to or lower than the upper limit speed at the time of turning. More specifically, at the time of turning, the upper limit speed is adjusted according to the inertia force index (for example, the lateral acceleration) that is correlated with the inertia force generated on the motorcycle 100 by turning. Accordingly, there is a case where the motorcycle 100 is already decelerated at a time point at which the exit of the curved road is detected ahead of the motorcycle 100. The control section 62 calculates the vehicle speed on the basis of the front-wheel rotational frequency sensor 43 and the rear-wheel rotational frequency sensor 44, for example, and then determines whether the motorcycle 100 is decelerated on the basis of a change in the vehicle speed.

If it is determined YES in step S521, in step S523, the control section 62 cancels the adjustment of the upper limit speed according to the lateral acceleration of the motorcycle 100. In this way, it is possible to reduce a magnitude of the deceleration of the motorcycle 100 (for example, accelerate the motorcycle 100) in the case where the motorcycle 100 is already decelerated at the time point before the motorcycle 100 reaches the exit of the curved road.

When the motorcycle 100 reaches the exit of the curved road, the driver performs an operation to stand the motorcycle 100 up in the rolling direction. In this way, the motorcycle 100 can travel straight. Here, in the case where a magnitude of the deceleration of the motorcycle 100 is excessively large at the time of performing the operation to stand the motorcycle 100 up in the rolling direction, it is likely to be difficult to stand the motorcycle 100 up in the rolling direction.

In the controller 60, as described above, the control section 62 preferably reduces the magnitude of the deceleration of the motorcycle 100 in the case where the motorcycle 100 is already decelerated at the time point before the motorcycle 100 reaches the exit of the curved road. As a result, it is possible to suppress the magnitude of the deceleration of the motorcycle 100 from becoming excessively large when the motorcycle 100 reaches the exit of the curved road. Thus, the driver can appropriately perform the operation to stand the motorcycle 100 up in the rolling direction.

Next, the control flow illustrated in FIG. 5 is terminated.

As described above, in the control flow illustrated in FIG. 5, the control section 62 detects the entry of the curved road on the basis of the predicted route of the motorcycle 100 during the adaptive cruise control, and decelerates the motorcycle 100 at the time point before the motorcycle 100 reaches the entry of the curved road.

In addition, in the control flow illustrated in FIG. 5, during the adaptive cruise control, the control section 62 detects the exit of the curved road on the basis of the predicted route of the motorcycle 100, and reduces the magnitude of the deceleration of the motorcycle 100 in the case where the motorcycle 100 is already decelerated at the time point before the motorcycle 100 reaches the exit of the curved road.

Here, from a perspective of further appropriately controlling the acceleration/deceleration of the motorcycle 100, the control section 62 may prohibit the acceleration/deceleration control, which is executed at the time point before reaching the entry or the exit of the curved road, on the basis of the lean angle.

More specifically, the control section 62 may prohibit the deceleration of the motorcycle 100, which is performed at the time point before the motorcycle 100 reaches the entry of the curved road, on the basis of the lean angle of the motorcycle 100. For example, in the case where the lean angle of the motorcycle 100 is larger than a reference angle at the time point before the motorcycle 100 reaches the entry of the curved road, the control section 62 prohibits the deceleration of the motorcycle 100. The reference angle is set to a value with which it is possible to appropriately determine whether the motorcycle 100 is intentionally tilted by the driver or stood up by the driver.

In addition, the control section 62 may prohibit the reduction in the magnitude of the deceleration of the motorcycle 100, which is performed at the time point before the motorcycle 100 reaches the exit of the curved road, on the basis of the lean angle of the motorcycle 100. For example, in the case where the lean angle of the motorcycle 100 is equal to or smaller than the reference angle at the time point before the motorcycle 100 reaches the exit of the curved road, the control section 62 prohibits the reduction in the magnitude of the deceleration of the motorcycle 100.

The description has been made above on the method for using the index value dyTraj, which has been described with reference to FIG. 6, as the method for detecting the entry or the exit of the curved road. However, as described above, the method for detecting the entry or the exit of the curved road is not limited to the above example. For example, when detecting a position in the predicted route where the curvature is rapidly changed on the basis of curvature distribution in the predicted route of the motorcycle 100, the control section 62 may detect such a position as the entry or the exit of the curved road.

<Effects of Controller>

A description will be made on effects of the controller 60 according to the embodiment of the present invention.

In the controller 60, during the cruise control (for example, the adaptive cruise control), the control section 62 detects the entry of the curved road on the basis of the predicted route of the motorcycle 100, and decelerates the motorcycle 100 at the time point before the motorcycle 100 reaches the entry of the curved road. As a result, the motorcycle 100 can be brought into the decelerated state when reaching the entry of the curved road. Thus, the driver can appropriately perform the operation to tilt the motorcycle 100 in the rolling direction. Therefore, the motorcycle 100 can appropriately corner during the cruise control of the motorcycle 100.

Preferably, in the controller 60, during the cruise control, the control section 62 restricts the vehicle speed of the motorcycle 100 to be equal to or lower than the upper limit speed, reduces the upper limit speed at the time point before the motorcycle 100 reaches the entry of the curved road, and thereby decelerates the motorcycle 100. In this way, in the case where the vehicle speed is relatively high, the motorcycle 100 is decelerated, and thereby the driver can appropriately perform the operation to tilt the motorcycle 100 in the rolling direction. Meanwhile, in the case where the vehicle speed is low to such extent that the operation to tilt the motorcycle 100 in the rolling direction can be performed without decelerating the motorcycle 100, it is possible to suppress the motorcycle 100 from being unnecessarily decelerated.

Preferably, in the controller 60, during the cruise control, the control section 62 adjusts the upper limit speed at the time of turning according to the inertia force index, which is correlated with the inertia force generated by turning of the motorcycle 100. In this way, the motorcycle 100 can appropriately turn without going off the curved road.

Preferably, in the controller 60, during the cruise control, the control section 62 decelerates the motorcycle 100 on the basis of the curvature index, which is correlated with the curvature of the curved road, at the time point before the motorcycle 100 reaches the entry of the curved road. As a result, when the motorcycle 100 reaches the entry of the curved road, the motorcycle 100 can be tilted more easily in the rolling direction as the curvature of the curved road is increased. Thus, the driver can appropriately perform the operation to tilt the motorcycle 100 in the rolling direction.

Preferably, in the controller 60, during the cruise control, the control section 62 prohibits the deceleration of the motorcycle 100, which is performed at the time point before the motorcycle 100 reaches the entry of the curved road, on the basis of the lean angle of the motorcycle 100. In this way, it is possible to prohibit the deceleration of the motorcycle 100 in the case where the driver intentionally tilts the motorcycle 100 at the time point before the motorcycle 100 reaches the entry of the curved road, for example. Just as described, the deceleration of the motorcycle 100, which is performed at the time point before the motorcycle 100 reaches the entry of the curved road, is prohibited on the basis of the lean angle of the motorcycle 100. Thus, it is possible to suppress the motorcycle 100 from being decelerated against the driver's intention. Therefore, it is possible to further appropriately control the acceleration/deceleration of the motorcycle 100.

The present invention is not limited to each of the embodiments that have been described. For example, all or parts of the embodiments may be combined, or only a part of each of the embodiments may be implemented.

REFERENCE SIGNS LIST

1: Trunk
2: Handlebar
3: Front wheel
3a: Rotor
4: Rear wheel
4a: Rotor
5: Engine
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Forward monitoring sensor
42: Input device
43: Front-wheel rotational frequency sensor
44: Rear-wheel rotational frequency sensor
45: Inertial measurement unit
46: Lateral acceleration sensor
48: Master-cylinder pressure sensor
49: Wheel-cylinder pressure sensor
50: Hydraulic pressure control unit
51: Base body
60: Controller
61: Acquisition section
62: Control section
62a: Drive control section
62b: Brake control section
100: Motorcycle

The invention claimed is:

1. A controller (60) for controlling travel of a straddle-type vehicle (100), the controller comprising:
a control section (62) capable of executing cruise control in which acceleration/deceleration of the straddle-type vehicle (100) is automatically controlled without relying on an accelerating/decelerating operation by a driver, wherein
during the cruise control, the control section (62) detects an entry of a curved road on the basis of an index value (dyTraj) corresponding to a distance between a point (P), which is away from the straddle-type (100) in an advancing direction (X) by a reference distance (D), and a predicted trajectory (R) in a direction orthogonal to the advancing direction (X), wherein the predicted trajectory (R) is detected by a front monitoring sensor

(41) that detects various information on an area in front of the straddle-type vehicle (100), and decelerates the straddle-type vehicle (100) at a time point before the straddle-type vehicle (100) reaches the entry.

2. The controller according to claim 1, wherein during the cruise control, the control section (62) restricts a vehicle speed of the straddle-type vehicle (100) to be equal to or lower than an upper limit speed, reduces the upper limit speed at the time point before the straddle-type vehicle (100) reaches the entry, and thereby decelerates the straddle-type vehicle (100).

3. The controller according to claim 2, wherein during the cruise control, at the time of turning, the control section (62) adjusts the upper limit speed according to an inertia force index that is correlated with an inertia force generated on the straddle-type vehicle (100) by turning.

4. The controller according to claim 1, wherein during the cruise control, at the time point before the straddle-type vehicle (100) reaches the entry, the control section (62) decelerates the straddle-type vehicle (100) on the basis of a curvature index that is correlated with a curvature of the curved road.

5. The controller according to claim 4, wherein during the cruise control, the control section (62) prohibits deceleration of the straddle-type vehicle (100), which is performed at the time point before the straddle-type vehicle (100) reaches the entry, on the basis of a lean angle of the straddle-type vehicle (100).

6. The controller according to claim 1, wherein the cruise control includes adaptive cruise control in which the straddle-type vehicle (100) is made to travel according to a distance from said straddle-type vehicle (100) to a preceding vehicle, motion of said straddle-type vehicle (100), and the driver's instruction.

7. A control method for controlling travel of a straddle-type vehicle (100), the control method comprising:

during cruise control in which acceleration/deceleration of the straddle-type vehicle (100) is automatically controlled without relying on an accelerating/decelerating operation by a driver, detecting an entry of a curved road on the basis of an index value (dyTraj) corresponding to a distance between a point (P), which is away from the straddle-type (100) in an advancing direction (X) by a reference distance (D), and a predicted trajectory (R) in a direction orthogonal to the advancing direction (X), wherein the predicted trajectory (R) is detected by a front monitoring sensor (41) that detects various information on an area in front of the straddle-type vehicle (100); and decelerating the straddle-type vehicle (100) by a controller (60) at a time point before the straddle-type vehicle (100) reaches the entry.

\* \* \* \* \*